United States Patent [19]

Kristmanson

[11] Patent Number: 4,930,184
[45] Date of Patent: Jun. 5, 1990

[54] HINGE ASSEMBLY FOR CONNECTING A FLOAT TO A BASE

[76] Inventor: Donald J. Kristmanson, 7349 Ridge, Burnaby, British Columbia, Canada, V5A 1R5

[21] Appl. No.: 285,598

[22] Filed: Dec. 16, 1988

[51] Int. Cl.$^5$ ............................................. E05D 11/08
[52] U.S. Cl. ...................................... 16/273; 16/342; 16/379; 16/380; 16/387; 16/388; 16/389; 16/DIG. 33; 384/125; 403/149; 403/158; 114/266; 405/219; 405/220
[58] Field of Search ............... 16/2, 228, 273, 342, 16/348, 357, 360, 378, 379, 380, DIG. 27, DIG. 33, 386, 387, 388, 389, 390, 391, 392; 405/220, 202, 215, 218; 384/125, 297, 298, 299; 403/149, 158, 223, 224, 225, 226; 114/264, 266, 267

[56] References Cited

U.S. PATENT DOCUMENTS

| | | | |
|---|---|---|---|
| 2,845,320 | 7/1958 | Saunders et al. | 312/204 |
| 3,306,053 | 2/1967 | Fulton | 114/266 |
| 3,349,429 | 10/1967 | Suska | 16/275 |
| 3,881,791 | 5/1975 | Hentschel | 384/125 |
| 4,321,882 | 3/1982 | Sluys | 114/266 |
| 4,639,147 | 1/1987 | Schwarz | 389/125 |
| 4,790,672 | 12/1988 | Komplin | 384/125 |

FOREIGN PATENT DOCUMENTS

| | | | |
|---|---|---|---|
| 1134464 | 4/1957 | France | 16/342 |
| 1210277 | 3/1960 | France | 16/387 |
| 92415 | 7/1980 | Japan | 405/218 |
| 7502353 | 9/1975 | Netherlands | 405/218 |

OTHER PUBLICATIONS

Robishaw Engineering, Inc., "Flexifloat" Specifications.

Primary Examiner—Richard K. Seidel
Assistant Examiner—Edward A. Brown

[57] ABSTRACT

A hinge assembly means for connecting a float to a base includes a male member means connected to one of the base and the float having a cylindrical outwardly extending boss and a female member means connected to the other of the base and the float having a cylindrical, inwardly-extending recess. A resilient, rubber-like bearing sleeve means encircles and engages the outer circumference of the boss and is of a thickness to fit between the boss and the recess to rotatably attach the recess about the outer circumference of the sleeve.

18 Claims, 3 Drawing Sheets

HINGE ASSEMBLY FOR CONNECTING A FLOAT TO A BASE

BACKGROUND OF THE INVENTION

1. Field of the Invention

The present invention generally relates to a hinge assembly for use with marina floats and, more particularly, is concerned with a hinge assembly for connecting a finger slip to a main run of a marina.

2. Description of the Prior Art

Traditionally, marinas have been constructed to provide a series of floating docks or finger slips extending outwardly away from shore, to which boats may be moored. The finger slips are usually attached to a perpendicular main dock sometimes called a main run which runs parallel with the shoreline. Alternatively, the finger slips may be attached directly to shore, to a sea wall or to any other suitable base. In some cases finger slips can extend for forty feet or more from the main run. This perpendicular extension of finger slips creates significant lateral stresses at the end of the finger slip caused by collisions with a docking boat, wind action, boat wash, wave action and the like.

Because finger slips extend out and float on water they are also subject to vertical movement as water level changes due to wave action. Wave action can be particularly severe when caused by storms, boat wash or winds. In order to prevent this constant wave action from damaging the finger slip, the finger slip is usually hingedly attached to the main run permitting the finger slip to move upwardly and downwardly with the wave action.

A variety of methods have been provided for hingedly connecting a finger slip to a main run or to a base such as adjacent land. One common method is by means of a steel hinge pin passing through conventional brackets. The hinge pin extends from one side to the other side of the finger slip and is held in place by brackets attached to opposite sides of the end of a finger slip adjacent the main run. Such a hinge pin generally requires replacement every one or two years, due to corrosion and frictional wear. As well, a conventional hinge pin may become damaged through bending caused by wave action or by a collision with a boat. Conventional hinge pins must be replaced from time to time because of such bending which can cause the hinge to become inoperable. If this condition is not quickly repaired severe damage to the finger slip can result because the finger slip is unable to move up and down with the wave action. In an extreme situation the damage to the finger slip can be so severe as to break the hinge pin causing the finger slip to become dislodged from the main run or land. In addition, such a hinge pin does not provide lateral resiliency to absorb lateral movement on the finger slip.

SUMMARY OF THE INVENTION

The present invention provides a tough, corrosion free hinge assembly with integral resilience which can withstand considerable wave action and lateral movement caused by collision with boats coming to moorage, wind action and the like. This invention provides a male member and female member having a sleeve interposed between a boss on the male member and a recess on the female member. The sleeve is of sufficient thickness and has suitable resiliency to secure the male member to the female member and yet permit rotation of the female member about the sleeve relative to the male member. Furthermore, the sleeve provides a lateral resiliency to absorb lateral pressure on the finger slip. The male member may be attached to the main run or to the land and the female member may be attached to the finger slip. The male member is preferably made up of two faces perpendicular to one another with a triangular-shaped intermediate face joining the two. In this way, one face may be attached to the main run with the other face extending outwardly and containing the boss for rotatable attachment with the recess of the finger slip. The finger slip extends perpendicular from the main run away from shore to permit moorage of boats as in a conventional marina.

According to the invention there is provided a hinge assembly for connecting a float to a base. The hinge assembly includes a male member connected to one of the base and the float, the male member having a cylindrical, outwardly-extending boss. The hinge assembly also includes a female member connected to the other of the base and the float, the female member including a cylindrical, inwardly-extending recess. A resilient bearing sleeve encircles and engages the outer circumference of the boss and is of sufficient thickness to fit between the boss and the recess to rotatably attach the recess about the boss when in use. The sleeve may have a concave external face. Preferably, the sleeve is formed by bending a sheet of flat rubber-like material into a closed loop whereby anticlastic curvature forms the concave outer face. Advantageously, the internal face of the sleeve is convex. The abutting ends of the sleeve may be fastened together to form the closed loop.

The sleeve may be between 23.8 and 24.2 millimeters in thickness and is preferably about 24.0 millimeters in thickness. The sleeve may be made of CG 262 S.B.R. rubber and may have a shore A durometer hardness of between 50 and 70 and a tensile strength of between 400 and 600 pounds per square inch. Preferably, the shore A durometer hardness is about 60 and the tensile strength is about 500 pounds per square inch. The sleeve may have an elongation of between 250 and 310 percent.

The male member may comprise a triangular-shaped gusset having perpendicular, rectangular faces interconnected by a triangular shaped face. The boss extends from one face and the other face is connectable to one of the base and the float. The face of the male member which is connectable to one of the base and the float may include upper and lower parallel flanges which engage a longitudinal outwardly-extending rib on the side of one of the base and the float. The female member may be a normally vertically-disposed face with the recess formed therein. The face may have upper and lower parallel flanges which engage a longitudinal outwardly-extending rib on the side of one of the base and the float.

Advantageously, the float is hingedly attached to the base by means of a pair of hinge assemblies and wherein each opposite side of the float has a longitudinal outwardly-extending rib which engaged upper and lower flanges of respective female members. The recesses of each of the female members, when in use, cooperate with the respective bosses of cooperating male members, each of such male members having a sleeve about the circumference of the boss.

In a preferred embodiment the outer surface of the sleeve forms two annular parallel tire surfaces about the circumference of the sleeve for rotatable attachment of the recess to the sleeve.

Advantageously, the male and female members are each integrally formed and each comprises glass-reinforced plastic resin.

DRAWINGS

An embodiment of the invention will now be described in more detail with reference to the drawings, in which.

Figure 2:
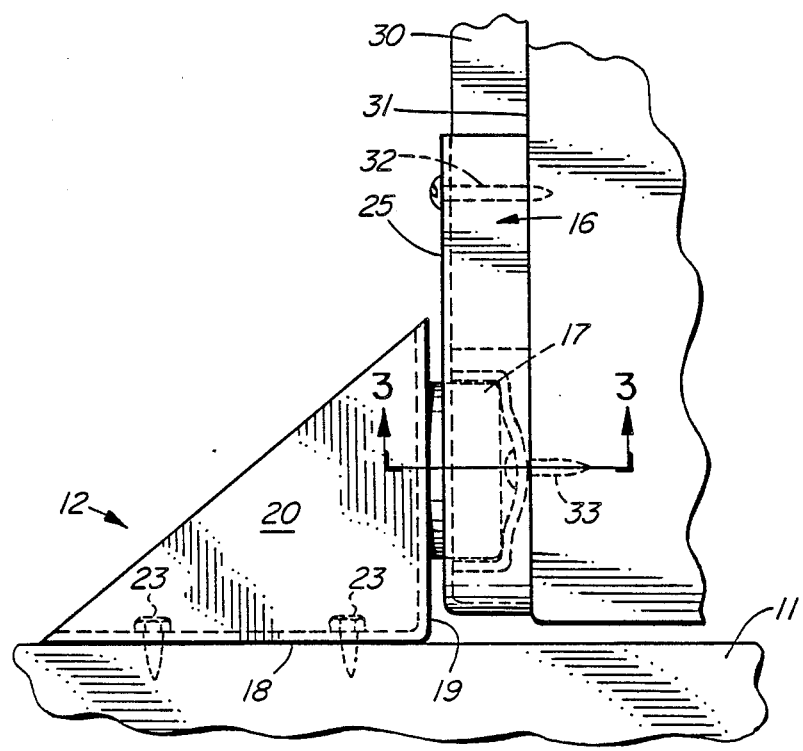
FIG. 2 is a simplified fragmented top plan of a hinge assembly and associated structure.
Figure 3:
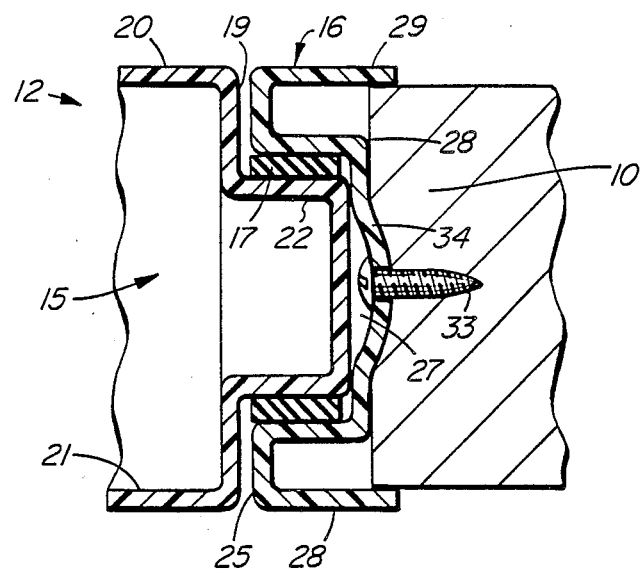
FIG. 3 is a simplified fragmented transverse section on line 3—3 of FIG. 2 showing portions of the hinge assembly.
Figure 3A:
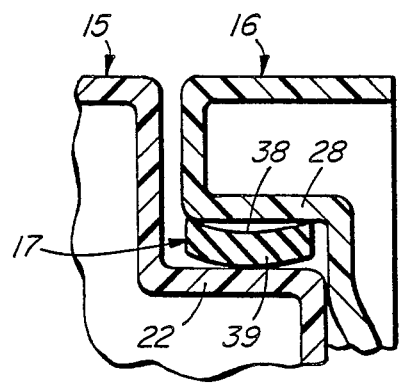
Figure 4:
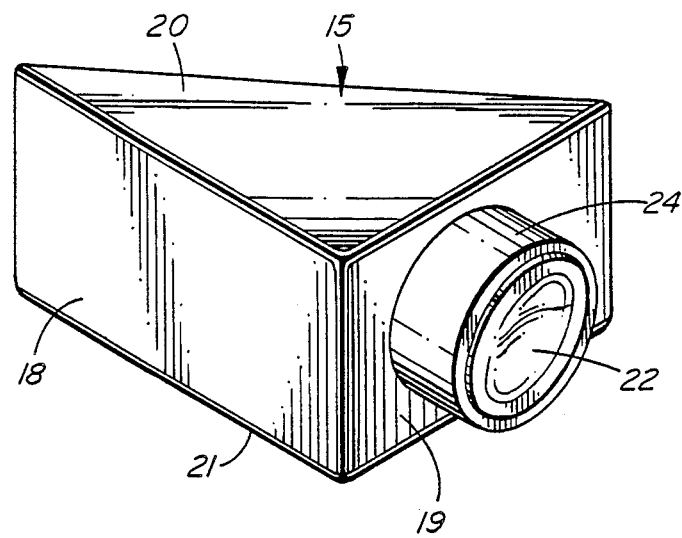
Figure 5:
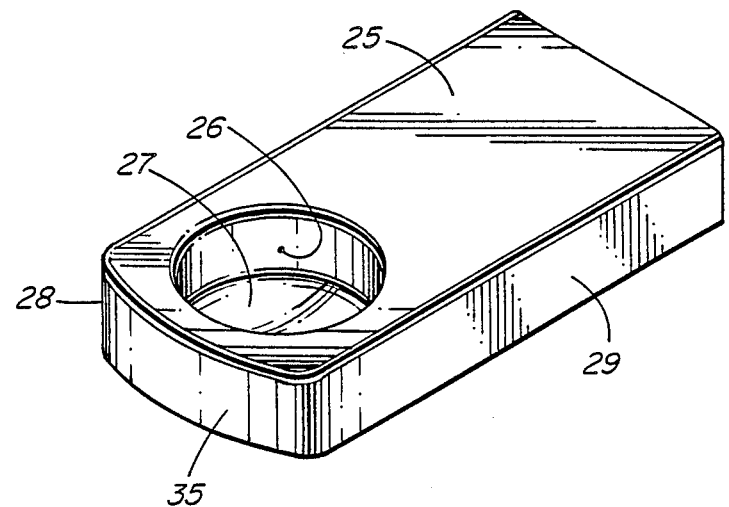

FIG. 3—A is a simplified fragmented transverse section on line 3—3 of FIG. 2 showing portions of the hinge assembly in cross-section in the area surrounding a portion of the sleeve;

FIG. 4 is a simplified perspective of the male member;

FIG. 5 is a simplified perspective of the female member.

DESCRIPTION OF THE PREFERRED EMBODIMENT(S)

Figure 1:
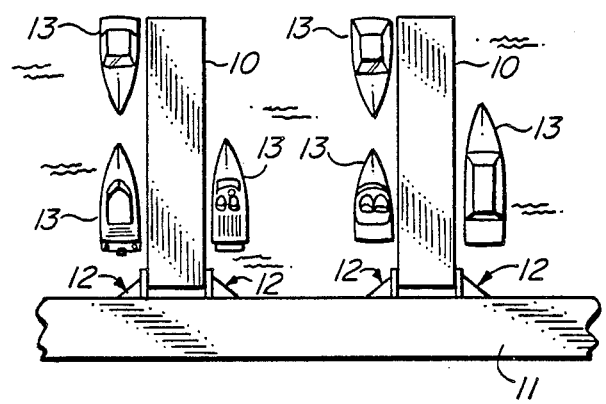
FIG. 1 is a simplified fragmented top plan of a marina showing a pair of finger slips extending from a main run.

For purposes of general illustration, FIG. 1 shows a marina made up of finger slips 10 extending laterally away from shore each being connected to main run 11 by a pair of preferred embodiment hinge assemblies 12. Boats 13 are shown for illustration adjacent slips 10. It should be understood that the attachment of finger slips 10 using assembly 12 need not necessarily be onto run 11. Any other suitable base, include a base fastened to shore or to a sea wall may be utilized.

As seen in FIGS. 2, 3 and 5 assembly 12 includes complementary male member 15 and female member 16, one of which is attached to the base and the other of which is attached to one side, and adjacent the end, of finger slip 10. A second assembly 12, including a complimentary male member 15 and female member 16, is attached to the other side of the same end of finger slip 10. Finger slip 10 is thereby sandwiched between each assembly 12 in such a manner as to hold slip 10 between assemblies 12 and to permit, vertical hinge motion of finger slip 10 about assemblies 12.

Referring to FIG. 4, male member 15 is a generally triangular-shaped gusset having perpendicular, rectangular faces 18 and 19 disposed at right angles to each other and interconnected by upper and lower triangular shaped faces 20 and 21 respectively. A cylindrical boss 22 extends outwardly from face 19 and has a smooth cylindrical outer surface.

FIG. 5 shows female member 16 which has a normally vertically disposed rectangular shaped face 25 having a cylindrical recess 27. Upper and lower parallel flanges 28 and 29 extend from the longitudinal edges of face 25 in the direction of recess 27. The surface of recess 27 is smooth and cylindrical in shape. Recess 27 is of suitable diameter larger than boss 22 to permit sleeve 17 to fit therebetween and to laterally secure recess 27 about boss 22 and permit rotation of recess 27 about sleeve 17 which is secured to boss 22.

Both male and female members 15 and 16 respectively, are preferably each integrally formed of glass reinforced plastic resin such as fibre-glass. Boss 22 is preferably integrally formed with face 19 of male member 15. Recess 27 is preferable integrally formed into face 25 of female member 16.

The attachment of male member 15 to main run 11 is best seen in FIG. 2. Screws 23 pass through face 18 of male member 15 to secure the male member to the main run. Face 18 may include suitably placed holes to accept screws 23 therein to facilitate the fastening of male member 15 to main run 11. Face 19, which includes boss 22, extends perpendicular to main run 11 for interconnection with female member 15.

The attachment of female member 16 to slip 10 is best seen in FIG. 2 and FIG. 3. A strip of wood 30 or like material extends longitudinally along each side face 31 of finger slip 10 and acts as a rib for attaching female member 16 to slip 10. Flanges 28 and 29 engage lower and upper surfaces, respectively, of wood 30. Flange 35 extends from the end of female member 16 in the direction of recess 27 and joins flanges 28 and 29. When female member 16 is attached to slip 10, flange 35 is positioned adjacent the end of wood 30 to ensure proper positioning of female member 16 on finger slip 10. The end of female member 16 opposite flange 35 is open to permit female member 16 to be affixed to wood 30 by flanges 28 and 29. Screw 32 extends through face 25 into wood 30 and finger slip 10 to secure female member 16 to finger slip 10. Similarly, screw 33 passes through face 25 at central depression 34 of recess 27 to further secure the female member to the finger slip. To facilitate fastening female member 16 to finger slip 10, holes may be positioned in face 25 and in depression 34 to accept screws 32 and 33 respectively therethrough. It can be seen that central depression 34 enables screw 33 to be used to secure member 16 to finger slip 10 without the screw interfering with the interfitting and rotation of boss 22 and recess 27.

Referring to FIG. 3, sleeve 17 tightly encircles the outer circumference of boss 22 to prevent movement of sleeve 17 in respect of boss 22. Sleeve 17 is formed by bending a flat sheet of rubber-like material into a closed loop about boss 22 and joining the abutting end faces of the sleeve. This bending of a flat sheet 17 causes anticlastic curvature on sheet 17. Recess 27 is of a circumference which is large enough to accept boss 22 with sleeve 17 thereabout. Recess 27 forms a seal with sleeve 17 which is tight enough to prevent boss 22 and sleeve 17 from lateral disengagement from recess 27. Recess 27 is of diameter which, while accommodating boss 22 and sleeve 17 therein, permits rotation of recess 27 about boss 22 with upward and downward motion on the opposite end of finger slip 10. Similarly a second assembly 12 is positioned on the other side of finger slip 10 to hingedly hold finger slip 12 between the assemblies.

The effectiveness of sleeve 17 is dependent on the correct selection of materials for the sleeve. Sleeve 17 is made of CG 262 S.B.R. rubber available from Custom Gaskets Ltd. of Vancouver, Canada. The rubber preferably has a shore A durometer hardness of about 60 and tensile strength of about 500 pounds per square inch; all measurements taken at 248° F. Suitable sleeve 17 may be formed within a shore A durometer hardness of between 50 and 70 and tensile strength of between 400 and 600 pounds per square inch; at 248° F. As well, elongation of between 250 and 310 percent, at 248° F. is preferred.

As shown in FIG. 3-A, anticlastic curvature produces a concave outer face 38, and a corresponding convex inner face 39, on sleeve 17. The space between cylindrical face 24 of boss 22 and cylindrical face 26 of recess 17 is very close to the thickness of sleeve 17, so that sleeve 17 is essentially flattened when male member 15 and female member are engaged. The anticlastic curvature and space between the sleeve and the male member and female member are shown exaggerated in FIG. 3-A.

The above-described anticlastic curvature tends to produce a pair of spaced annular tire surfaces about the circumference of sleeve 17 which provide added grip for female member 16 to engage. This also reduces the tendency of female member 16 to rock within male member 15 as a result of wave action and the like on finger slip 10. Sleeve 17 provides a rubber-like surface between male member 15 and female member 16 which acts as a resilient bearing sleeve which permits rotation of female member 16 about male member 15. This reduces or eliminates spalling of the gelcoat of the molding on male member 15 and female member 16. Sleeve 17 also provides a smooth surface to permit relative rotation of female member 16 about sleeve 17 facilitated by the tire surfaces. Furthermore, sleeve 17 may be readily removed and replaced when worn without necessarily replacing male and female members.

The interposing of sleeve 17 between boss 22 and recess 27 not only provides a resilient bearing sleeve which permits rotation of the male member and female member relative to each other, it also provides shock absorbing qualities on finger slip 10 and dampens rotation of the female member relative to the male member. The internal resiliency of sleeve 17 provides lateral resiliency to slip 10. Furthermore, the materials selected to form the male member, female member and sleeve are such as to provide high corrosion resistance essential to a marina environment, particularly in a salt-water marina. The fibreglass construction of the male and female members and the construction of the rubber-like sleeve are all particularly suited for a salt-water environment.

As is best seen in FIG. 1, while finger slip 10 is held in place partially by the gripping of recess 27 onto sleeve 17, a second assembly 12 is positioned on the opposite side of finger slip 10 with male member 15 attached to main run 11 to sandwich finger slip 10 therebetween. This sandwiching effect also serve to ensure that recesses 27 remain in place about sleeve 17 on each respective male member 11.

Various changes and modifications in the hinge assembly as herein described may occur to those skilled in the art, and to the extent that such changes or modifications are embraced by the appended claims, it is to be understood that they constitute a part of the present invention. The form hereinbefore described is merely a preferred or exemplary embodiment.

I claim:

1. A hinge assembly for connecting a marina float to a base, comprising means for connecting the marina float to the base, the means including:
   (a) a male member means connected to one of the base and the float having a cylindrical, outwardly-extending boss;
   (b) a female member means connected to the other of the base and the float having a cylindrical, inwardly-extending recess;
   (c) a resilient bearing sleeve means encircling and engaging the outer circumference of the boss, said sleeve being of a thickness to fit between the boss and the recess to rotatably attach the recess about the outer circumference of the sleeve.

2. A hinge assembly as described in claim 1, wherein the sleeve means has a concave external face.

3. A hinge assembly as described in claim 2, wherein the sleeve means is formed by bending a sheet of flat rubber-like material into a closed loop whereby anticlastic curvature forms the concave external face.

4. A hinge assembly as described in claim 1, wherein the sleeve means is between 23.8 millimeters and 24.2 millimeters in thickness.

5. A hinge assembly as described in claim 1, wherein the sleeve means is approximately 24.0 millimeters thick.

6. A hinge assembly as described in claim 4, wherein the sleeve means comprises CG 262 S.B.R. rubber having a shore A durometer hardness of between 50 and 70 and tensile strength of between 400 and 600 pound per square inch, all at 248° F.

7. A hinge assembly as described in claim 4, wherein the sleeve means comprises CG 262 S.R.B. rubber having a shore A durometer hardness of about 60 and tensile strength of about 500 pounds per square inch; all at 248° F.

8. A hinge assembly as described in claim 6 wherein the sleeve means is capable of an elongation of between 250 and 310 percent under tension.

9. A hinge assembly as defined in claim 1, wherein the male member means comprises a triangular-shaped gusset having two perpendicular, rectangular faces interconnected by a triangular shaped face whereby the boss extends from one of the rectangular faces and whereby the other of the rectangular faces is connectable to one of the base and the float.

10. A hinge assembly as defined in claim 1, wherein the female member means comprises a normally vertically-disposed face with the recess formed therein.

11. A hinge assembly as described in claim 9, wherein one of the base and the float further comprises an outwardly-extending rib and the other rectangular face of the male member means has upper and lower parallel flanges which engage the rib therebetween to attach the male member means to said one of the base and the float.

12. A hinge assembly as described in claim 10, wherein one of the base and the float further comprises an outwardly-extending rib and the face of the female member means has upper and lower parallel flanges which engage the rib therebetween to attach the female member means to said one of the base and the float.

13. A hinge assembly as defined in claim 12, wherein each opposite side of the float has, an outwardly-extending rib, each rib engaging respective upper and lower flanges of two female member means, the recesses of each of such female member means cooperating with the respective bosses of adjacent male member means, each of such male member means having a sleeve means about the circumference of the boss.

14. A hinge assembly as claimed in claim 1, wherein the sleeve means has a convex internal face.

15. A hinge assembly as described in claim 2, wherein the concave external face has outer edges forming two annular parallel tire surfaces about the circumference of the sleeve means for rotatable attachment of the recess to the outer circumference of the sleeve means.

16. A hinge assembly as described in claim 1, wherein the male member means and the female member means are each integrally formed and each comprises glass-reinforced plastic resin.

17. A hinge assembly as described in claim 1, wherein the sleeve means comprises styrene-butadiene.

18. A hinge assembly as described in claim 1, wherein the sleeve means comprises CG 262 S.B.R. rubber.

* * * * *